United States Patent Office 3,493,599
Patented Feb. 3, 1970

3,493,599
FLUOROCARBON-NITRILE PROCESS AND PRODUCTS THEREOF
Arthur H. Ahlbrecht, Dellwood, Minn., assignor to Minnesota Mining and Manufacturing Company, St. Paul, Minn., a corporation of Delaware
No Drawing. Filed June 8, 1966, Ser. No. 555,953
Int. Cl. C07c 143/74, 121/42
U.S. Cl. 260—465.4          2 Claims

ABSTRACT OF THE DISCLOSURE

A process of reacting fluorocarbon amides with $\alpha,\beta$-unsaturated propionitriles (such as acrylonitrile and methacrylonitrile) and adducts obtained thereby. The fluorocarbon amide (a primary or secondary amide having at least one amide hydrogen atom) is added across the carbon-carbon double bond of the unsaturated propionitrile. The amide hydrogen atom is bonded to one ethylenic carbon atom of the propionitrile (usually the one $\alpha$ to the cyano group) while the remainder of the fluorocarbon amide is bonded to the other. The adducts of the invention are useful in dielectric fluids, heat transfer media, lubricants, release coatings and oil- and water-repellent coatings.

DETAILED DESCRIPTION

The present invention relates to a process of reacting fluorocarbon amides with $\alpha,\beta$ unsaturated propionitriles and to adducts obtained thereby.

It is an object of this invention to provide a novel method for the production of fluorocarbon group containing adducts.

It is another object of the invention to provide a novel class of fluorocarbon group-containing adducts.

It is still another object of the invention to provide certain novel oil- and water-repellent treating agents for substrates.

It is still another object of the invention to provide novel lubricants and lubricant additives.

It is a further object of the invention to provide a new class of reactive chemical compounds.

It is a still further object of the invention to provide durably oil- and water-repellent articles.

It is still another object of the invention to provide durably oil- and water-repellent fibers.

Various other objects of the invention will become apparent to those skilled in the art upon reading the following description and disclosure.

The process of the invention relates to the addition of a fluorocarbon amide to an unsaturated propionitrile (acrylonitrile or methacrylonitrile) and the recovery of the resulting adduct. Thus, according to the invention a fluorocarbon amide having a hydrogen atom bonded to the amide nitrogen (a primary or secondary amide) is added across the carbon-carbon double bond of an unsaturated propionitrile so that the hydrogen atom is bonded to one carbon atom adjacent the double bond, the remainder of the fluorocarbon amide is bonded to the other, the double bond is converted to a single (carbon-carbon) bond and the resulting adduct is recovered. As will be seen hereinafter, the fluorocarbon amide can be chosen so that it can enter into one or more than one such unit reaction (depending upon the number of amide hydrogens therein).

Ordinarily, but not invariably, the addition occurs in such a way that the amide hydrogen atom adds to the ethylenic carbon atom of the unsaturated propionitrile which is $\alpha$ to the cyano group thereof and the remainder of the fluorocarbon amide adds to the ethylenic carbon atom which is $\beta$ to the nitrile group. For convenience, the addition will be referred to herein as occurring in this manner, although it is understood that the reverse addition is also contemplated (i.e. in which the hydrogen atom adds to the ethylenic carbon atom which is $\beta$ to the nitrile group and the remainder of the fluorocarbon amide adds to the ethylenic carbon atom which is $\alpha$ to the nitrile group).

The fluorocarbon amides which are useful in the process of the invention include both monoamides and diamides and the individual functions can be either sulfonamides or carboxamides. In addition, the functions can be either primary amides (in which two hydrogen atoms are bonded to the amide nitrogen) or secondary amides (in which one hydrogen atom is bonded to the amide nitrogen). Among these compounds are the following:

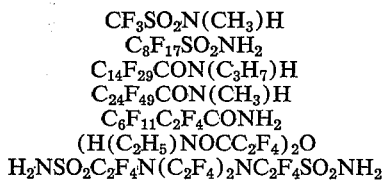

These compounds ordinarily contain between 1 and about 50 carbon atoms, preferably not more than about 30 carbon atoms.

The fluorocarbon groups of the fluorocarbon amides can be a perfluoroalkyl group having an open (acyclic) straight- or branched-chain, or a cyclic structure (e.g. a perfluorocyclohexyl group having a 6-membered ring structure) or it can consist of a combination of perfluoroalkyl straight chain and perfluorocyclic groups. The fluorocarbon group may be bonded to the remainder of the molecule through either a cyclic or an acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure. A minor percentage of the fluorine atoms in the fluorocarbon groups (preferably not more than about 20 per cent thereof) can also be replaced by such other atoms as hydrogen, chlorine, bromine, etc.

The fluorocarbon amide precursors can be mono-, di- or poly-functional with respect to the unit reaction with the ethylenic double bond of an unsaturated propionitrile, the functionality depending upon the number of hydrogen atoms bonded to amide nitrogen atoms therein. Thus, for example, a mono-secondary amide is mono-functional, a mono-primary amide or a di-secondary amide is di-functional, a diamide having one primary amide function and one secondary amide function is trifunctional, a di-primary amide is tetrafunctional, etc. The unsaturated propionitriles are monofunctional with respect to the unit reaction. Depending upon the relatives amounts of the two reactants utilized, the adduct can contain no reactive amide hydrogen or can contain one or more reactive amide hydrogen atoms therein, in the case of di- or poly-functional amides.

A preferred class of the adducts of the invention are compounds which have the formula:

wherein $R_f$ is a fluorocarbon group preferably a perfluoroalkyl group of not more than 25 carbon atoms, Q is —CO— or —SO$_2$—, R' is hydrogen or methyl and R is hydrogen, an alkyl group containing up to about six carbon atoms or —CH$_2$C(R')HCN. Particularly preferred among these compounds are those in which R$_f$ is a perfluoroalkyl group containing from about 3 to 18 carbon atoms.

The process of the invention is normally carried out in the presence of a highly basic catalyst such, for example, as a tertiary aliphatic amine and/or a heterocyclic amine, e.g. triethylamine or pyridine. An inert solvent, particularly one which will dissolve the fluorocarbon amide at the temperature of reaction, can also be added to the reaction mixture if desired. Among the solvents which are useful are lower aliphatic ethers, such as diethyl ether and the dimethyl ether of tetraethylene glycol and aromatic hydrocarbons, such as benzene, toluene and xylene, and alcohols, e.g. ethanol.

The reaction is normally run at a temperature above about 50° C. and is preferably in the range of from about 80 to 150° C. or at the reflux temperature of the mixture. It is sometimes advantageous to carry out the reaction in a pressure vessel in order to raise the reaction temperature without danger of losing all or a part of the reaction mixture, particularly when especially volatile solvents or reactants are used. At the end of the reaction, the desired adduct can be removed by various known techniques, such as crystallization, distillation (especially vacuum distillation) etc. The catalysts are often neutralized with a strong inorganic acid at the end of the reaction. They are generally water soluble and can be easily removed from the remainder of the reaction mixture if desired.

The adducts of the invention vary from liquids to lower melting solids. Those in which reactive groups remain are valuable intermediates for further reactions, e.g. they can be further reacted to form adducts of the invention which contain no active groups. The adducts of the invention which have no reactive groups have various uses as follows: The liquids are generally useful as dielectric fluids and heat transfer media. They are also highly polar and therefore tend to adsorb on metal surfaces and function well as lubricants. The solids form release coatings, are useful as components in solid lubricant mixtures and some can be used as oil- and water-repellent coatings. The adducts which are used for oil- and water-repellent coatings (e.g. on fibrous and porous surfaces such as woven fabrics or cloth, random web materials including felt and paper, wood, leather, fur, asbestos, ceramics, cast polymers, etc.) are preferably those which have perfluorinated groups containing at least 3 and normally not more than about 18 fully fluorinated carbon atoms, such as perfluoroalkyl groups. Adducts to be used in lubrication applications usually need contain only trifluoromethyl groups, although larger fluorochemical groups are preferred.

The following examples are offered to furnish a better understanding of the present invention and are not to be construed as in any way limiting thereof. All percentages are by weight unless otherwise specified.

Example 1.—C$_8$F$_{17}$SO$_2$N(C$_2$H$_5$)CH$_2$CH$_2$CN

A mixture of 26.35 g. (0.05 m.) of C$_8$F$_{17}$SO$_2$N(C$_2$H$_5$)H, 12 g. (0.214 m.) of CH$_2$=CHCN, 3 g. of a 40% methanolic solution of benzyltrimethyl ammonium hydroxide and 100 mls. of 95% ethanol were heated on a steam bath for three hours. The reaction mixture was cooled to 0° C., and filtered to remove 2.0 g. of a white solid. The mixture was reheated to 80° C. for an additional hour, cooled and filtered. This procedure was repeated to give a total of 20.1 g. (69% yield) of C$_8$F$_{17}$SO$_2$N(C$_2$H$_5$)CH$_2$CH$_2$CN, M.P. 106–107° C.

Analysis.—Calc. for C$_{13}$F$_{17}$H$_9$N$_2$O$_2$S: C, 26.9; F, 55.7; H, 1.55; N, 4.82. Found: C, 27.3; F, 56.3; H, 1.7; N, 4.79.

In a similar manner C$_8$F$_{17}$SO$_2$N(CH$_3$)CH$_2$CH$_2$CN was prepared from C$_8$F$_{17}$SO$_2$N(CH$_3$)H and CH$_2$=CHCN in 78% yield. This adduct had a melting point of 125–131° C.

Example 2.—C$_8$F$_{17}$SO$_2$N(CH$_2$CH$_2$CN)$_2$ 5 g. (0.01 m.) of C$_8$F$_{17}$SO$_2$NH$_2$, 5.3 g. (0.1 m.) of CH$_2$=CHCN, 3 g. of a 40% methanolic solution of benzyltrimethyl ammonium hydroxide and 25 mls. of 95% ethanol were refluxed together for three hours. The mixture was cooled to 0° C. and the resulting white precipitate filtered. The mixture was again heated to reflux for one hour, cooled and filtered. The combined precipitates weighed 1.8 g. A sample recrystallized from ethanol and acetonitrile had a M.P. 170–172° C. The infrared spectrum of this material showed no absorption in the 3.0μ region thus indicating an absence of amido hydrogen and supporting the structure

C$_8$F$_{17}$SO$_2$N(CH$_2$CH$_2$CN)$_2$.

Analysis.—Calc. for C$_{14}$F$_{17}$H$_8$N$_3$SO$_2$: C, 27.8; F, 53.4. Found: C, 27.7; F, 54.6.

Example 3.—C$_5$F$_{11}$CONHCH$_2$CH$_2$CN

A mixture of 15.7 g. (0.05 m.) of C$_5$F$_{11}$CONH$_2$, 10.6 g. (0.20 m.) of CH$_2$=CHCN, 5 g. of benzyltrimethyl ammonium (40% methanolic solution) and 45 mls. of 95% ethanol was refluxed for ten hours. The reaction mixture was cooled to 0° C. and filtered to remove a white solid. The mixture was refluxed for an additional hour, cooled and filtered. This procedure was repeated to give 5.2 g. of a white solid, M.P. 94°–96° C. after recrystallization from benzene. The infrared spectrum of this material showed absorption in the 3.0μ region and in the 5.8μ region indicating the presence of amide hydrogen and carbonyl respectively, thus supporting the foregoing structure.

Analysis.—Calc. for C$_9$F$_{11}$H$_5$N$_2$O: C, 29.5; H, 1.36; N, 7.65. Found: C, 29.9; H, 1.3; N, 7.6.

What is claimed is:

1. An adduct having the formula:

R$_f$QN(R)CH$_2$C(R')HCN wherein R$_f$ is a perfluoroalkyl group containing not more than 25 carbon atoms, Q is —CO— or —SO$_2$—, R' is hydrogen or methyl and R is hydrogen, an alkyl group containing up to about six carbon atoms or

—CH$_2$C(R')HCN

2. An adduct having the formula:

R$_f$QN(R)CH$_2$C(R')HCN wherein R$_f$ is a perfluoroalkyl group containing from 3 to 18 carbon atoms, Q is —CO— or —SO$_2$—, R' is hydrogen or methyl and R is hydrogen, an alkyl group containing up to about six carbon atoms or

—CH$_2$C(R')HCN

References Cited

UNITED STATES PATENTS 2,424,664   7/1947   McQueen _____ 260—465.5
3,350,218   10/1967  Gagliardi _____ 260—404.5

DANIEL D. HORWITZ, Primary Examiner

U.S. Cl. X.R.

260—465.7, 404.5, 464; 252—47, 51; 117—121; 106—38.2, 2; 252—8.57, 8.7, 8.8, 65, 66, 73